United States Patent
Casalini et al.

(10) Patent No.: US 8,161,852 B2
(45) Date of Patent: Apr. 24, 2012

(54) ROTARY CENTERING DEVICE FOR THE GUIDED TRANSFER OF BARS FROM A FEEDER TO A LATHE

(75) Inventors: Maurizio Casalini, Faenza (IT);
Claudio Magnani, Mezzano (IT);
Pierantonio Melandri, Faenza (IT);
Massimo Ragazzini, Faenza (IT);
Andrea Bassi, Faenza (IT)

(73) Assignee: Imeca Giuliani Macchine Italia S.p.A., Faenza (IT)

( * ) Notice: Subject to any disclaimer, the term of this patent is extended or adjusted under 35 U.S.C. 154(b) by 12 days.

(21) Appl. No.: 12/736,482

(22) PCT Filed: Apr. 16, 2009

(86) PCT No.: PCT/EP2009/054503
§ 371 (c)(1),
(2), (4) Date: Oct. 13, 2010

(87) PCT Pub. No.: WO2009/127682
PCT Pub. Date: Oct. 22, 2009

(65) Prior Publication Data
US 2011/0048184 A1 Mar. 3, 2011

(30) Foreign Application Priority Data
Apr. 17, 2008 (IT) ............................. BO2008A0240

(51) Int. Cl.
*B23B 13/12* (2006.01)
*B23B 13/00* (2006.01)

(52) U.S. Cl. ........................................... 82/127; 82/126
(58) Field of Classification Search ................... 82/124, 82/126, 127, 150, 170
See application file for complete search history.

(56) References Cited

U.S. PATENT DOCUMENTS

| | | | |
|---|---|---|---|
| 2,944,454 A * | 7/1960 | Vasselli | 82/15 |
| 3,815,930 A * | 6/1974 | Mattes | 279/50 |
| 4,034,632 A | 7/1977 | Lohner | |
| 5,910,200 A * | 6/1999 | Cucchi | 82/126 |
| 6,098,509 A * | 8/2000 | Drei et al. | 82/127 |
| 7,458,299 B2 * | 12/2008 | Ragazzini et al. | 82/124 |
| 2006/0107803 A1 | 5/2006 | Ragazzini et al. | |

FOREIGN PATENT DOCUMENTS

| | | |
|---|---|---|
| DE | 29 30 310 A1 | 10/1980 |
| EP | 0286010 A | 10/1988 |

* cited by examiner

*Primary Examiner* — Will Fridie, Jr.
(74) *Attorney, Agent, or Firm* — Modiano & Associati; Albert Josif; Daniel J. O'Byrne

(57) ABSTRACT

A rotary centering device for the transfer of a bar from the guiding channel of a feeder to a lathe, comprising a supporting element and provided with at least one circular seat in which a grip element for a bar is supported, the grip element being constituted by a bush which has a tubular portion and a plurality of sectors connected to the tubular portion, elastic elements being provided which act on the bush and are designed to control its axial movement between a first stop position, in which the sectors define a circular opening whose diameter is the same as that of the bar, and a second position, in which the sectors are moved until they form an opening to allow the passage of the bar pusher.

12 Claims, 6 Drawing Sheets

ROTARY CENTERING DEVICE FOR THE GUIDED TRANSFER OF BARS FROM A FEEDER TO A LATHE

The present invention relates to a device for centering a bar at the output of a feeder for feeding a lathe, particularly an automatic lathe.

BACKGROUND OF THE INVENTION

As is known, the bar being machined in an automatic lathe, once inserted in the guiding channel of a feeder, is made to advance by means of a bar pusher toward the lathe, where it is picked up by the mandrel and turned to perform the machinings. The bar pusher is provided, at the front end, with a tool that consists of a fastening collet, which is composed of a plurality of jaws arranged in an annular configuration and allows to grip the rear end of the bar, push it toward the lathe to perform the machinings, and then recover and expel the unmachined end portion that remains in the collet when the bar pusher is retracted into the feeder.

Since the fastening collet has a larger diameter than the bar, it cannot pass through the devices provided to keep the bar guided at the output of the feeder and along the portion that leads from the output of the feeder to the mandrel of the lathe and are needed to eliminate or at least reduce the effects caused by geometric imperfections (eccentricities) and the polygonal cross-sections of the bars, and therefore harmful vibrations occur which affect the feeder and the lathe. In order to reduce these vibrations, it has already been suggested to arrange at the output of the channel of the feeder in which the bar is guided, a centering device that is composed of a ring of sectors that opens to allow the passage of the collet for fastening the bar pusher and closes when the collet has passed. For example, a device of this type is the subject of EP 1 669 145 in the name of this same Applicant.

However, known centering devices have proved to be complex in construction. Moreover, the elements that are intended to keep the bar centered do not rotate and therefore offer only support to the bar being machined, which instead rotates in them since it is turned by the lathe, and therefore wear of the jaws and vibrations occur.

SUMMARY OF THE INVENTION

The aim of the present invention is to provide a device that allows to keep the bars centered at the output from the feeder, so as to avoid the above-mentioned drawbacks.

Within this aim, an object of the present invention is to provide a device that allows to keep the bar centered not only at the output from the feeder but also along the guiding channel thereof.

Another object of the present invention is to provide a device that is simple and cheap to manufacture and highly reliable in operation.

This aim and these and other objects, which will become better apparent hereinafter, are achieved with a rotary centering device, the characteristics of which are defined in the appended claims.

BRIEF DESCRIPTION OF THE DRAWINGS

Further characteristics and advantages of the invention will become better apparent from the following detailed description of some preferred but not exclusive embodiments thereof, illustrated by way of non-limiting example in the accompanying drawings, wherein.

DESCRIPTION OF THE PREFERRED EMBODIMENTS

Figure 1:
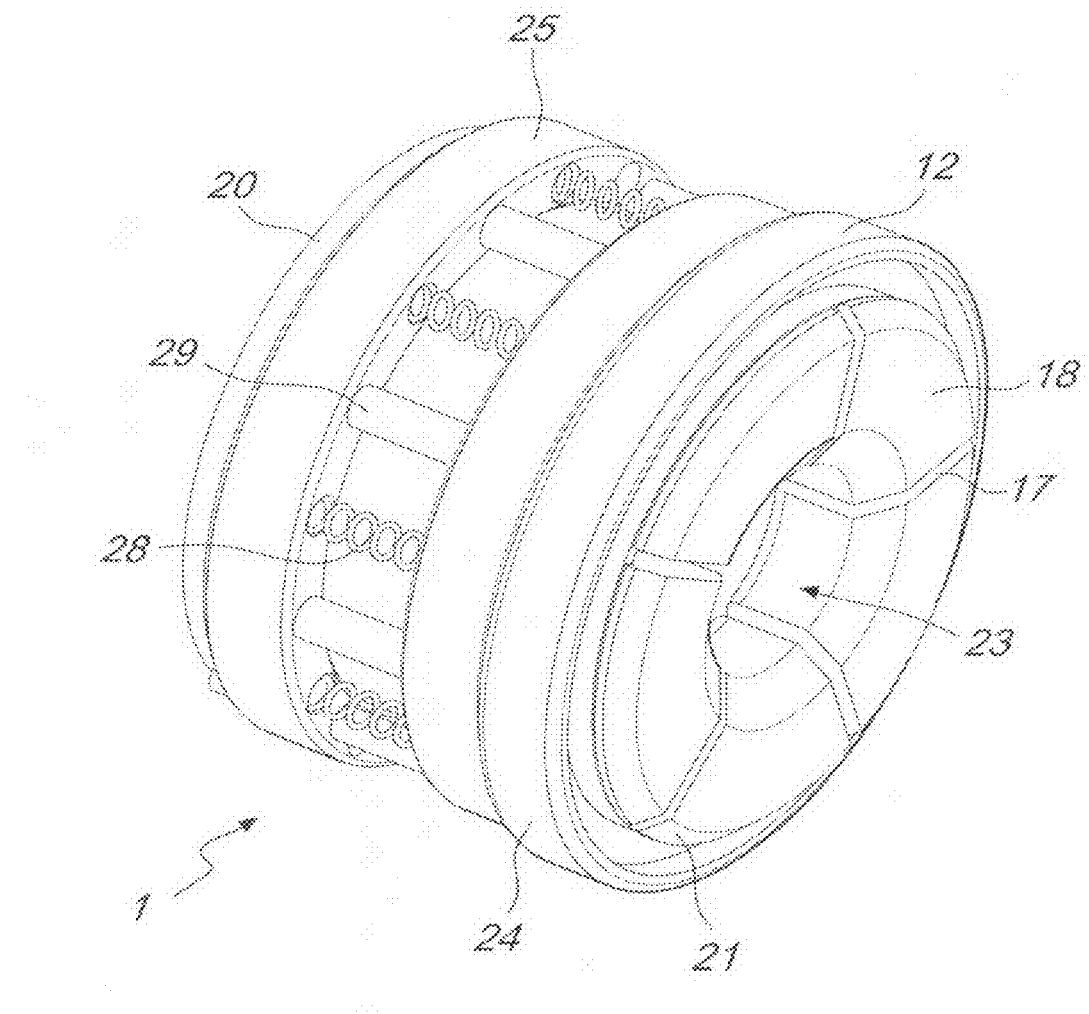
FIG. 1 is a perspective view of a device according to the invention.
Figure 2:
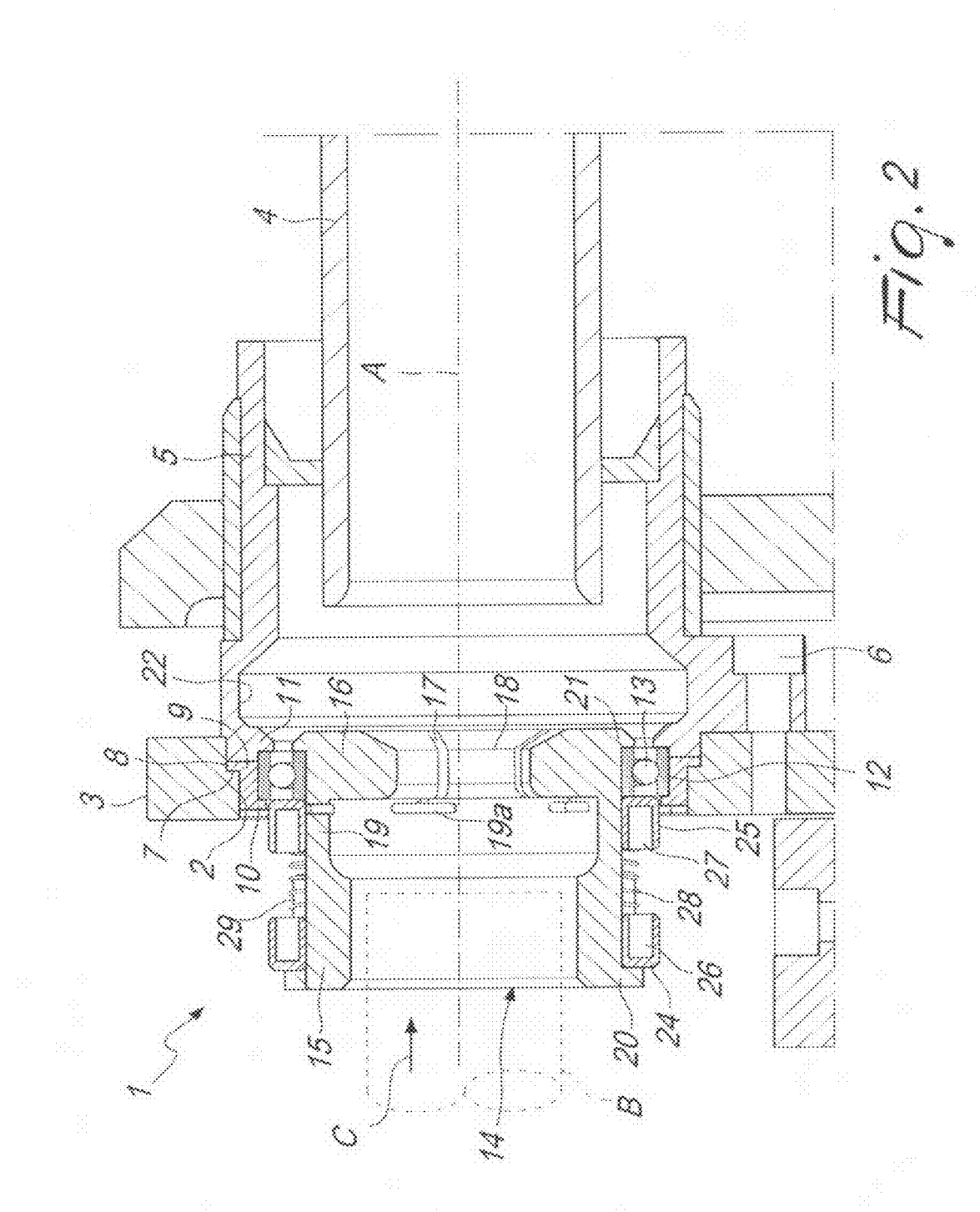
FIG. 2 is an axial sectional view of the device of FIG. 1.
Figure 3:
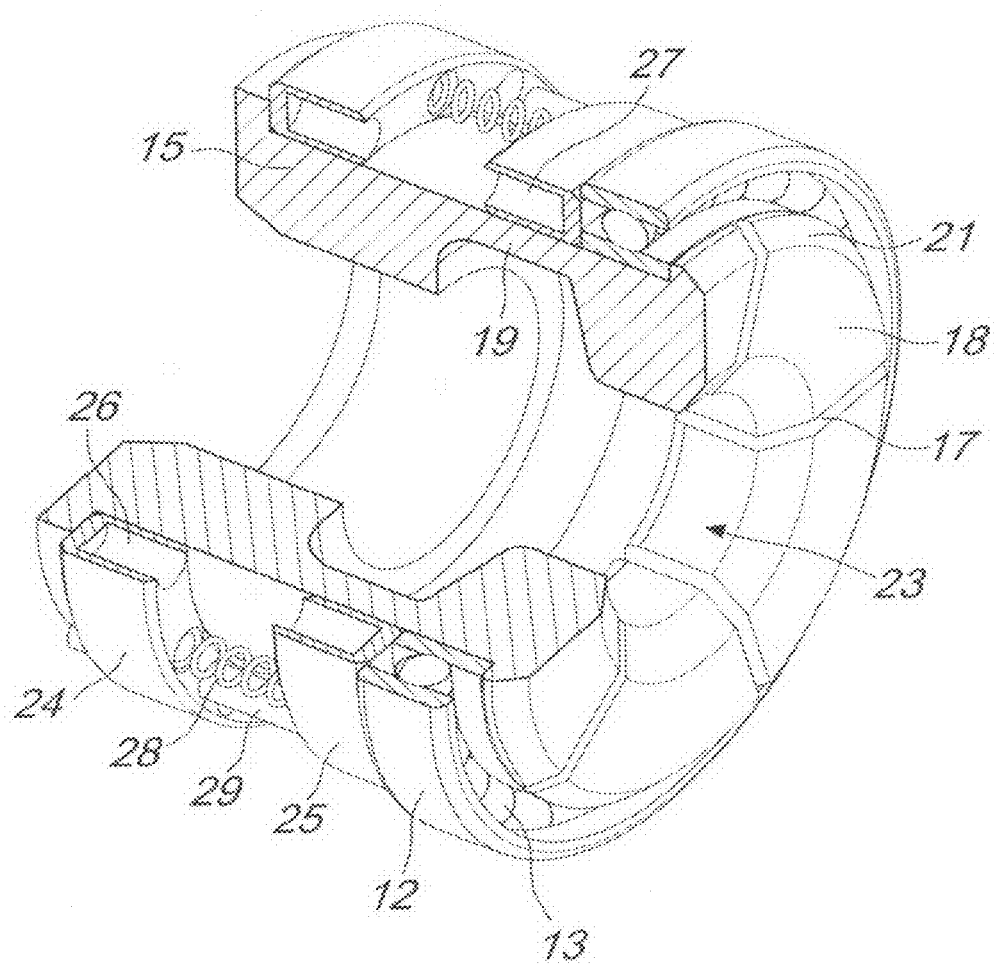
FIG. 3 is an axial sectional perspective view, taken along two perpendicular planes.
Figure 4:
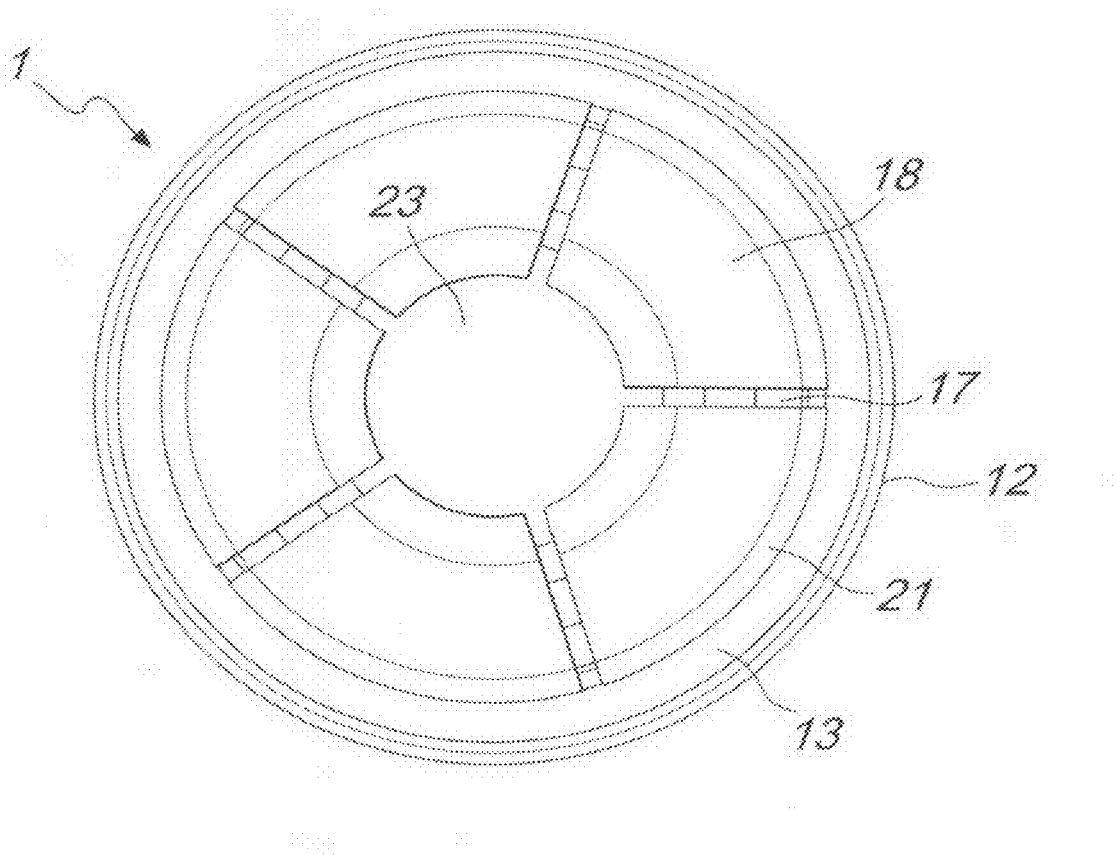
FIG. 4 is a front view of the device according to the invention.

With reference to FIGS. 1-4, the reference numeral 1 generally designates a rotary centering device that is mounted in a cantilever fashion at the output of a feeder and coaxially along an axis A with the bar guiding channel. More precisely, the device 1 is supported in a circular seat 2 which is provided in a supporting element, such as a flange 3 associated with the end of the feeder and is aligned with the inlet of the lathe. In order to be able to guide the bar from the output of the feeder to the mandrel of the lathe, there is a tube 4 that is supported in a sleeve 5 that is centered in the seat 2 and is fixed to the flange 3 by means of screws 6.

The seat 2 has a shoulder 7, and an outer collar 8 of a ring 9 is fastened between such shoulder and the end of the sleeve 5. Such ring is provided with an inner collar 10, which, together with a front edge 11 of the sleeve 5, defines a receptacle in which an outer ring 12 of a rolling bearing 13 is locked.

The bearing 13 supports rotationally a bush 14, which is made of plastics and has characteristics of elasticity and resistance to mechanical stresses and wear. The bush 14 acts as a grip element designed to retain on the axis A a bar B that is driven through it, preventing any vibrations. In the bush 14 there is, on the side directed toward the bar guiding channel, a tubular portion 15 and, on the side directed toward the lathe, a portion 16 that is divided by notches 17, which lie on angularly equidistant radial planes, into a plurality of sectors 18.

The portions 15 and 16 are mutually connected by a thinner intermediate portion 19, in which weakening slots 19a are provided which allow the sectors 18 to flex outward or to bend slightly inward insofar as allowed by the notches 17. In particular, the ability of the sectors 18 to bend inward is preset to allow the tapering of the portion 16 and its insertion through the bearing 13 during the assembly of the bush 14.

The bush 14 has a perfectly cylindrical outer surface and is delimited at its opposite ends by two collars 20, 21, of which the collar 21 is divided by the notches 17. The outside diameter of the bush 14 is slightly smaller than the inside diameter of the bearing 13. In this manner, the bush 14, when actuated axially, can slide with minimal play within the bearing 13 and perform axial strokes from a position for abutment against the collar 21 to a position in which the sectors 18 are located at an inner annular flared portion 22 of the sleeve 5 that is proximate to the bearing 13.

The sectors 18 have a greater thickness, in a radial direction, than the portion 15 and extend into the bush 14 toward the axis A, so that when the collar 21 that they form abuts against the bearing 13, they enclose a circular passage or opening 23, whose diameter is smaller than the inside diameter of the portion 15. However, when the bush 14 is subjected to axial thrust in a direction C (see FIG. 2) and is moved toward the tube 4, the sectors 18 can flex toward the flared portion 22 and widen the opening 23.

In practice, the diameter of the opening 23 is sized so that the sectors 18 are in contact with the bar B that is driven through them, so as to avoid radial plays and the onset of vibrations of the bar during its advancement toward the lathe.

On the outer surface of the bush 14, in the portion comprised between the collars 20, 21, there are two rings 24, 25, in which there are dead holes 26, 27, which open onto each other and are frontally aligned. The opposite ends of elastic means, such as cylindrical springs 28 and of pins 29 arranged between the adjacent springs are inserted in the holes 26, 27. The pins 29 have such a diameter and length that they can slide in the dead holes 26, 27, keeping however the rings 24, 25 mutually rotationally coupled. The springs 28 are preset to be able to generate such an axial expansion force as to retain the rings 24, 25 in abutment against the collar 20 and respectively against the inner ring of the bearing 13 and a radial force component that keeps the sectors 18 fastened onto the bar.

The operation of the centering device 1 according to the invention, although inherently intuitive from the drawings, is as follows.

Assume an operating position in which the bar B has been transferred from the bar magazine into the feeder guiding channel and that the fastening collet of the bar pusher has gripped its rear end. Assume also that the device 1 is configured as shown in FIG. 1. With this configuration, the force applied by the springs 28 onto the ring 24 actuates by reaction the collar 21 of the sectors 18 in abutment against the bearing 13, so that the bush 14 remains locked in a position in which the sectors 18 define the circular opening 23 equal to the outside diameter of the bar B. Since the diameter of the bar B to be fed to the lathe, as mentioned earlier, is smaller than the inside diameter of the portion 15 of the bush 14, but is equal to the diameter of the passage 23, the bar B, once pushed by the bar pusher in the direction A and after passing through the portion 15, is therefore guided and supported by the sectors 18 of the bush 14 and perfectly aligned with the axis of the lathe.

When the fastening collet of the bar pusher arrives at the sectors 18, since it has a larger diameter than the passage 23, the further advancement of the bar pusher produces the abutment of the collet against the sectors 18, which is followed by the advancement of the bush 14 and therefore the enlargement of the passage 23 formed by the sectors 18 until a diameter that allows the passage of the fastening collet is reached. In this manner, the fastening element can continue its advancement stroke while the bar B remains perfectly guided during the execution of the subsequent machining steps.

Since the sectors 18 remain in contact on the bar pusher fastening collet due to the elastic force applied by the springs 28, A is possible to return the bar pusher to the initial position and return the last piece of bar that is unmachined to the collection point and the collar 21 in contact with the bearing 13, since the passage 23 has reacquired dimensions that are equal to the outside diameter of the loaded bar B.

A substantial advantage of the present invention, in addition to the ones specified above, is constituted by the fact that the bush 14 allows an opening and closing movement of the sectors 18 without having to resort to actuators. Moreover, the structure of the bush 14 allows to use plastics that have a low cost, high mechanical strength and wear resistance, and are capable of absorbing machining noise significantly. Further significant advantages of the device are constituted by its limited space occupation and by the possibility to shape the sectors 18 complementarily with respect to the cylindrical or polygonal profile of the bars.

It is noted that the device 1 allows to work even when the diameter of the bar B is larger than the diameter of the passage 23. In this case, the bar B, after passing through the portion 15 and abutting against the sectors 18, in fact moves the bush 14, which after overcoming the repulsion force of the springs 28 slides within the bearing 13, moving the collar 21 away from such bearing. Once the collar 21 has become spaced from the bearing 13 by an extent that is sufficient for the flexing point of the sectors 18 in the portion 19 to have moved beyond the bearing 13, the thrust of the bar B against the sectors 18 causes their opening toward the flared portion 22, allowing the front end of the bar to continue toward the lathe. This opening of the sectors 18 is followed by the further opening by the bar pusher fastening collet.

The device is susceptible of numerous modifications and variations, all of which are within the scope of the appended claims, as a function of the structure of the feeder and of the characteristics of the lathe.

Figure 5:
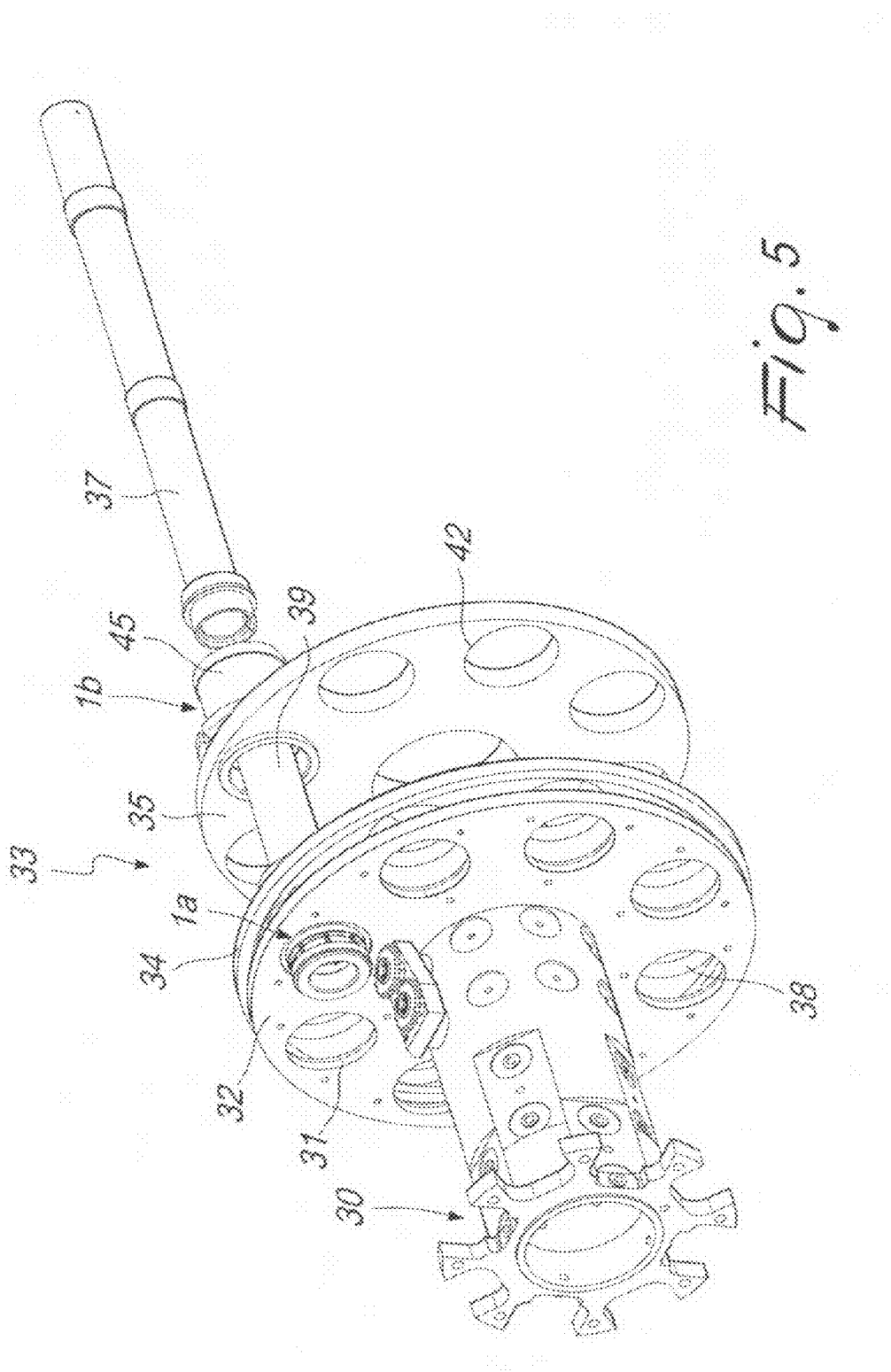
FIG. 5 is a perspective view of the front portion of a feeder with a drum-like structure on which the device according to the invention is mounted.
Figure 6:
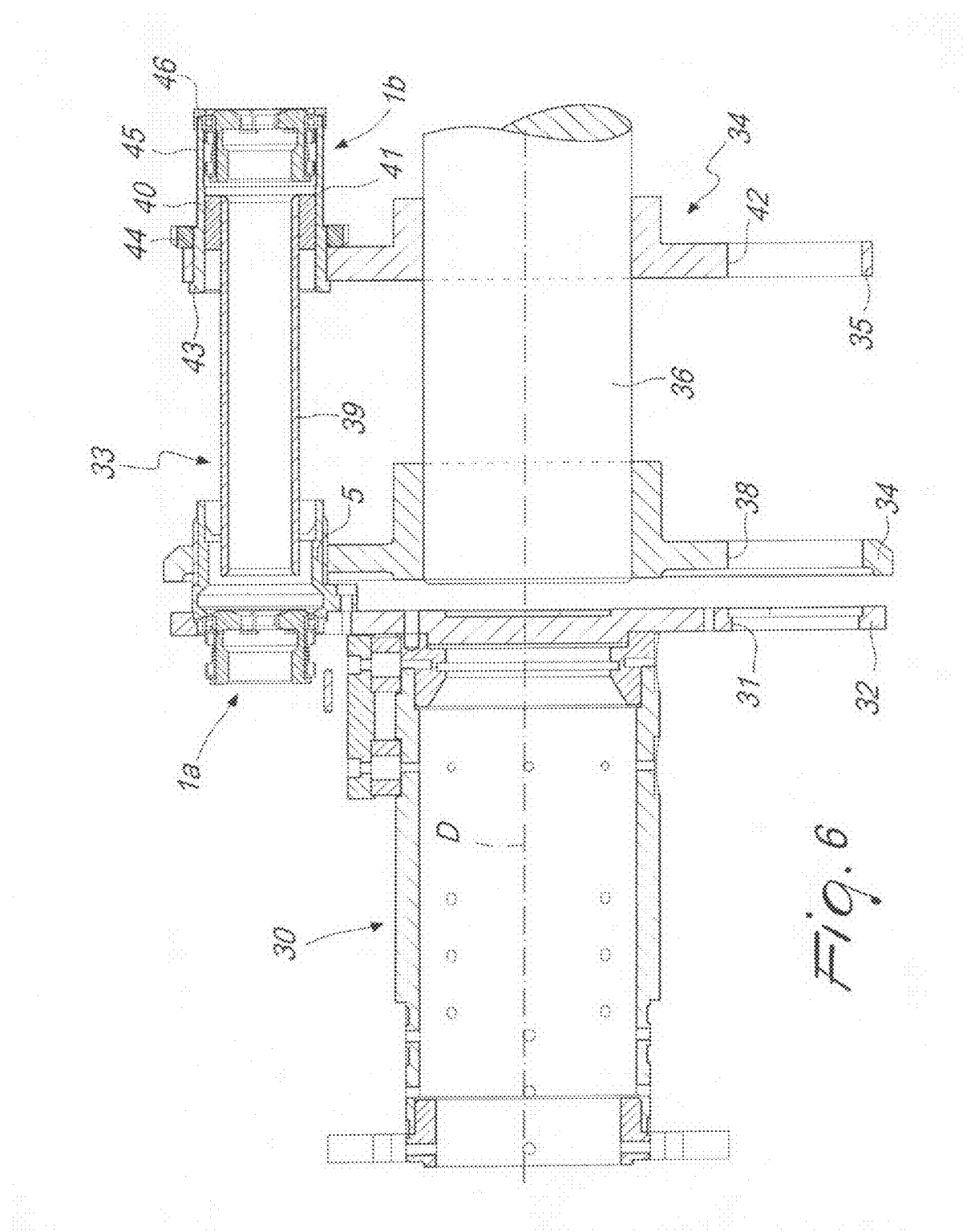
FIG. 6 is an axial sectional view of the structure of FIG. 5.

FIGS. 5, 6 show an embodiment that uses a plurality of centering devices 1 according to the present invention in a feeder of the so-called drum type for feeding a lathe of the multimandrel type. Only the front part of a drum of such feeder, generally designated by the reference numeral 30, is shown in FIGS. 5, 6.

The drum 30 can turn about an axis D and comprises a plurality of guiding channels for the bars B, which are arranged coaxially around the axis D.

The guiding channels (not shown in the figures) are aligned with respective seats 31 constituted by circular openings provided in a disk 32 that is frontally associated with the front part of the drum 30 of the feeder.

The disk 32 constitutes the mechanical element that is equivalent to the flange 3 of the embodiment described previously for support in the seats 31 of the centering devices 1.

A rotating body, generally designated by the reference numeral 33, is arranged between the disk 32 and the multimandrel lathe and comprises a pair of disks 34, 35, which are keyed onto a shaft 36 of the lathe that is coaxial to the axis D that moves the rotating body 33.

The multimandrel lathe is assumed to have a traditional construction; FIGS. 5, 6 show, of such lathe, in addition to the shaft 36, one tube 37 of the tubes that guide the bars fed by the feeder to the respective assemblies that perform the machinings.

Circular openings 38 are formed in the disk 34 that is adjacent to the disk 32, and the sleeves 5 of the various centering devices are engaged in such openings and, in FIGS. 5, 6, in order to distinguish them from the ones of the previously described embodiment, are designated by the reference numeral 1a. The end of respective tubular cylinders 39 is inserted in the sleeves 5, and such cylinders have the opposite end centered in cuffs 41 by means of a spacer ring 40.

Each cuff 41 is inserted in a respective opening or seat 42 of the disk 35 until it abuts against a collar 43 and is locked against such collar by means of a ring 44 that is screwed onto the cuff 41. The cuff 41 is extended, by means of an end portion 45, beyond the end of the tubular cylinder 39, and such end portion accommodates a further centering device, designated by the reference numeral 1b.

The inside diameter of the portion 45 is slightly larger than the inside diameter of the rings 24, 25 of the device 1b, so that the rings 24, 25 can slide freely in the cuff 41. To secure the device 1b inside the cuff 41, the bearing 13 of the latter is centered with its outer ring in a seat provided inside the end portion 45 and is locked in such seat by means of a ring 46.

From what has been described above it is fully evident that the bars B, during their transfer from the respective guiding channels of the drum 30 to the lathe, remain in any case centered along the portion comprised between the output from the feeder and the spindles of the lathe by means of the centering devices 1a, 1b mounted on the disk 34.

In particular, it is noted that in view of the spaced arrangement between the centering device 1a at the input of the cuff 41 and the centering device 1b at the output thereof, it is possible to obtain two different diameters of the openings 23 formed by the sectors 18 of the bushes 14 of the devices 1a, 1b, so as to allow simultaneously the centering of the bar B by the device 1b and of the bar pusher by the device 1a.

The described device therefore achieves the proposed aim and objects. In a practical embodiment of the invention, the elements and components can be replaced with other technically equivalent ones which therefore fall within the scope of the appended claims. Thus, for example, instead of the springs 28 it is possible to provide a single cylindrical spring that surrounds the bush 14 and acts by expansion between the rings 24, 25. In a further variation it is possible to provide the regions of the sectors 18 that are designed to come into contact with the surface of the bar to be machined with portions made of a material that is different from the material of the bush and is adapted to offer firmer rotary grip on the bar.

The disclosures in Italian Patent Application No. BO2008A000240 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A rotary centering device for the transfer of a bar from the guiding channel of a feeder to a lathe, comprising a supporting element that is associated with the output of the feeder and is provided with at least one circular seat in which a grip element for a bar is supported rotatably and slidingly along an axis that is coaxial to said guiding channel, said grip element being constituted by a bush made of flexible plastic material, which has a tubular portion and a plurality of sectors connected to said tubular portion so that they can flex on planes that are radial with respect to said axis, elastic means being provided which act on said bush and are designed to control its axial movement between a first stop position, in which said sectors define a circular opening whose diameter is the same as that of the bar, so as to be able to guide without play said bar during its transfer toward the lathe, and a second position, in which said sectors, after being affected by the bar pusher, are moved until they form an opening to allow the passage of the bar pusher and determine the loading of said elastic means and the fastening of said sectors on said bar pusher, so as to retain it coaxially with respect to said axis.

2. The device according to claim 1, comprising a bearing that is accommodated in said seat for the rotary support of said bush, said bush being able to slide axially in said bearing.

3. The device according to claim 1, wherein said bush comprises a tubular portion whose inside diameter is larger than the diameter of the bar and a portion that is divided into sectors that extend radially toward the axis, so as to form, in said first position, an opening whose diameter is smaller than the diameter of the bar, said sectors being connected to said tubular portion by an intermediate portion provided with weakening slots such as to allow the sectors to flex toward the axis.

4. The device according to claim 3, wherein said bush is provided, at its opposite ends, with two collars, which protrude outward from said tubular portion and from said sectors, and in that in the region of said bush that is comprised between said collars there are said bearing and elastic means that act between said bearing and the collar that protrudes from said sectors so as to produce the fastening of the sectors on the bar due to the abutment of the bearing on the sectors.

5. The device according to claim 4, wherein said elastic means comprise a plurality of expansion springs arranged between a pair of rings which are arranged between said bearing and the collar arranged at the end of said tubular portion.

6. The device according to claim 5, wherein said rings are provided with mutually opposite dead holes in which guiding pins are inserted.

7. The device according to claim 1, wherein a ring is arranged in said seat and forms a receptacle for the outer ring of said bearing, said ring being locked in said seat by a sleeve.

8. The device according to claim 1, wherein said supporting element is constituted by a first disk provided with a plurality of seats which are arranged concentrically around an axis of rotation of said first disk and form seats, said seats being aligned with respective guiding channels of the feeder and with the mandrels of the lathe.

9. The device according to claim 8, wherein a rotating body is functionally associated between said first disk and said lathe and is composed of a pair of disks, which are mutually spaced and are provided with openings which are aligned with the mandrels of said lathe and with the seats of said first disk, and composed of cuffs that lie between said aligned openings, said openings defining seats.

10. The device according to claim 9, wherein said disks are rotationally jointly connected to a motorized shaft of said lathe.

11. A combination of a feeder and a lathe, comprising a device according to claim 1.

12. The combination of claim 11, wherein said feeder is a drum-like feeder and said lathe is a multimandrel lathe.

* * * * *

UNITED STATES PATENT AND TRADEMARK OFFICE
CERTIFICATE OF CORRECTION

| | | |
|---|---|---|
| PATENT NO. | : 8,161,852 B2 | Page 1 of 1 |
| APPLICATION NO. | : 12/736482 | |
| DATED | : April 24, 2012 | |
| INVENTOR(S) | : Maurizio Casalini et al. | |

It is certified that error appears in the above-identified patent and that said Letters Patent is hereby corrected as shown below:

Title Page (73) Assignee should read: Iemos Giuliani Macchine Italia S.p.A., Faenza (IT)

Signed and Sealed this
Twenty-sixth Day of June, 2012

David J. Kappos
*Director of the United States Patent and Trademark Office*